United States Patent
Luo et al.

(10) Patent No.: US 9,608,780 B2
(45) Date of Patent: Mar. 28, 2017

(54) TRANSMIT DIVERSITY FOR SC-FDMA

(75) Inventors: Xiliang Luo, San Diego, CA (US);
Peter Gaal, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1298 days.

(21) Appl. No.: 12/564,670

(22) Filed: Sep. 22, 2009

(65) Prior Publication Data

US 2010/0085955 A1   Apr. 8, 2010

Related U.S. Application Data (60) Provisional application No. 61/099,375, filed on Sep. 23, 2008.

(51) Int. Cl.
*H04L 5/00* (2006.01)
*H04B 7/06* (2006.01)
(Continued)

(52) U.S. Cl.
CPC ........... *H04L 5/0023* (2013.01); *H04B 7/068* (2013.01); *H04B 7/0667* (2013.01); *H04L 1/0618* (2013.01); *H04L 27/2607* (2013.01)

(58) Field of Classification Search
CPC ............... H04L 2/2636; H04L 2/2697; H04L 2025/03414; H04L 23/02; H04W 72/1257;
(Continued)

(56) References Cited

U.S. PATENT DOCUMENTS 6,122,260 A * 9/2000 Liu et al. ............... 370/280
6,834,043 B1 * 12/2004 Vook et al. ............. 370/310
(Continued)

FOREIGN PATENT DOCUMENTS

CN    1675853 A    9/2005
CN    101056132 A   10/2007
(Continued)

OTHER PUBLICATIONS

"STBC-II Scheme for Uplink Transmit Diversity in LTE-Advanced", 3GPP TSG RAN WG1 Meeting #53bis, R1-082500, Warsaw, Poland, Jun. 30-Jul. 4, 2008.
(Continued)

*Primary Examiner* — Dung B Huynh
(74) *Attorney, Agent, or Firm* — Liem T. Do (57) ABSTRACT

Techniques for transmitting data with transmit diversity for single-carrier frequency division multiple access (SC-FDMA) are described. In one design, a transmitter (e.g., a UE) may form a first symbol vector including first and second modulation symbol sequences. The transmitter may also form a second symbol vector including third and fourth modulation symbol sequences, which may be generated based on the second and first modulation symbol sequences, respectively. Each symbol vector may further include a cyclic prefix and possibly a cyclic postfix for each modulation symbol sequence. The transmitter may generate a first SC-FDMA symbol based on the first symbol vector and a second SC-FDMA symbol based on the second symbol vector. The transmitter may transmit the first and second SC-FDMA symbols from two transmit antennas in a single SC-FDMA symbol period to achieve transmit diversity.

30 Claims, 8 Drawing Sheets

(51) Int. Cl.
*H04L 1/06* (2006.01)
*H04L 27/26* (2006.01)

(58) Field of Classification Search
CPC ... H04W 72/0466; H04W 24/02; H04J 13/18; H04J 13/0074; H04J 13/004; H04J 2211/006
See application file for complete search history.

(56) References Cited

U.S. PATENT DOCUMENTS

| | | | |
|---|---|---|---|
| 6,993,094 B1* | 1/2006 | Eberlein et al. | 375/326 |
| 7,095,709 B2 | 8/2006 | Walton et al. | |
| 7,362,815 B2* | 4/2008 | Lindskog et al. | 375/264 |
| 2004/0081205 A1* | 4/2004 | Coulson | 370/503 |
| 2005/0068918 A1* | 3/2005 | Mantravadi et al. | 370/328 |
| 2005/0084035 A1* | 4/2005 | Kim et al. | 375/295 |
| 2005/0276349 A1* | 12/2005 | Egashira et al. | 375/299 |
| 2006/0067421 A1* | 3/2006 | Walton et al. | 375/267 |
| 2006/0193268 A1* | 8/2006 | Walton et al. | 370/264 |
| 2007/0041457 A1* | 2/2007 | Kadous et al. | 375/260 |
| 2007/0165705 A1* | 7/2007 | Coon | 375/148 |
| 2007/0189151 A1* | 8/2007 | Pan et al. | 370/210 |
| 2007/0195906 A1* | 8/2007 | Kim et al. | 375/267 |
| 2007/0211815 A1* | 9/2007 | Pan et al. | 375/267 |
| 2008/0002645 A1 | 1/2008 | Seki et al. | |
| 2008/0014969 A1 | 1/2008 | Laroia et al. | |
| 2008/0049709 A1* | 2/2008 | Pan et al. | 370/344 |
| 2008/0080641 A1* | 4/2008 | Kim | 375/299 |
| 2008/0117999 A1* | 5/2008 | Kadous et al. | 375/267 |
| 2008/0165891 A1* | 7/2008 | Budianu et al. | 375/299 |
| 2008/0192849 A1* | 8/2008 | Kim et al. | 375/267 |
| 2008/0227481 A1* | 9/2008 | Naguib et al. | 455/550.1 |
| 2008/0240285 A1* | 10/2008 | Han et al. | 375/295 |
| 2008/0240311 A1* | 10/2008 | Piirainen et al. | 375/344 |
| 2008/0273516 A1* | 11/2008 | Kim et al. | 370/344 |
| 2008/0285675 A1* | 11/2008 | Roberts | 375/267 |
| 2009/0003488 A1 | 1/2009 | Ban | |
| 2009/0163143 A1 | 6/2009 | De Rore | |
| 2009/0204863 A1* | 8/2009 | Kim et al. | 714/748 |
| 2009/0285193 A1* | 11/2009 | Kim et al. | 370/342 |
| 2009/0303866 A1* | 12/2009 | Li et al. | 370/208 |
| 2010/0034186 A1* | 2/2010 | Zhou et al. | 370/344 |
| 2010/0034312 A1* | 2/2010 | Muharemovic et al. | 375/267 |
| 2010/0041350 A1* | 2/2010 | Zhang | H04B 7/068 455/101 |
| 2010/0064038 A1* | 3/2010 | Hu | 709/223 |
| 2010/0067368 A1* | 3/2010 | Lee et al. | 370/210 |
| 2010/0067512 A1* | 3/2010 | Nam et al. | 370/342 |
| 2010/0074305 A1* | 3/2010 | Lee et al. | 375/135 |
| 2010/0091903 A1* | 4/2010 | Castelain et al. | 375/295 |
| 2010/0227621 A1* | 9/2010 | Wu | 455/450 |
| 2010/0316093 A1* | 12/2010 | Ko et al. | 375/147 |
| 2011/0075651 A1* | 3/2011 | Jia et al. | 370/344 |
| 2011/0107174 A1* | 5/2011 | Liu et al. | 714/752 |
| 2011/0134747 A1* | 6/2011 | Kwon et al. | 370/208 |
| 2011/0134902 A1* | 6/2011 | Ko et al. | 370/344 |
| 2011/0142076 A1* | 6/2011 | Ko et al. | 370/480 |
| 2011/0149944 A1* | 6/2011 | Ko et al. | 370/344 |
| 2011/0149945 A1* | 6/2011 | Nakao et al. | 370/344 |
| 2011/0222588 A1* | 9/2011 | Ko et al. | 375/135 |
| 2012/0093248 A1* | 4/2012 | Kwon et al. | 375/261 |

FOREIGN PATENT DOCUMENTS

| | | | | |
|---|---|---|---|---|
| CN | 101267412 A | 9/2008 | | |
| EP | 2015532 A1 | 1/2009 | | |
| JP | 2008011037 A | 1/2008 | | |
| WO | WO 9953666 A1 * | 10/1999 | | H04L 27/26 |
| WO | 2007095102 A1 | 8/2007 | | |
| WO | WO2007095102 A1 | 8/2007 | | |
| WO | 2007119215 A2 | 10/2007 | | |
| WO | WO 2007118411 A1 * | 10/2007 | | |
| WO | WO2007119215 A2 | 10/2007 | | |
| WO | 2008008984 A2 | 1/2008 | | |
| WO | WO 2008022511 A1 * | 2/2008 | | H04B 7/26 |
| WO | WO-2008098672 A1 | 8/2008 | | |

OTHER PUBLICATIONS

"Uplink transmit diversity schemes for LTE Advanced", 3GPP TSG RAN WG1 #53bis meeting, R1-082522, Warsaw, Poland, Jun. 30-Jul. 4, 2008.
Taiwan Search Report—TW098132183—TIPO—Mar. 1, 2013.
Cristina Ciochina., et al., "A Novel Space-Frequency Coding Scheme for Single Carrier Modulations" Proceedings of IEEE International Symposium on Personal, Indoor and Mobile Radio Communications, Sep. 1, 2007 (Sep. 1, 2007), pp. 1-5, XP031168487 ISBN: 978-1-4244-1143-6.
International Search Report and Written Opinion—PCT/US2009/058106—ISA/EPO—Feb. 22, 2010.
Alcatel, ST/SF Coding and Mapping Schemes of the SC-FDMA in E-UTRA Uplink, 3GPP TSG RAN WG1 Meeting #47 R1-063178, (Nov. 1, 2006), [online], <URL: http://www.3gpp.org/ftp/tsg_ran/wg1_rl1/TSGR1_47/Docs/R0-063178.zip>.
InterDigital Communications Corporation, Extension of Uplink MIMO SC-FDMA with Preliminary Simulation Results, 3GPP TSG-RAN WG1#44 R1-060365, (Feb. 9, 2006), [online], <URL: http://www.3gpp.org/ftp/tsg_ran/wg1_rl1/TSGR1_44/Docs/R0-060365.zip>.
Alcatel Shanghai Bell,"STBC-II Scheme with Non-Paired Symbols for LTE-Advanced Uplink Transmit Diversity", 3GPP TSG RAN WG1 Meeting #54, R1-082817, Aug. 22, 2008, pp. 1-5.

* cited by examiner

TRANSMIT DIVERSITY FOR SC-FDMA

The present application claims priority to provisional U.S. Application Ser. No. 61/099,375, entitled "TRANSMIT DIVERSITY SCHEME OVER SINGLE SINGLE-CARRIER FREQUENCY DIVISION MULTIPLEXING SYMBOL FOR LONG TERM EVOLUTION ADVANCED UPLINK," filed Sep. 23, 2008, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support transmit diversity in order to improve performance of data transmission. Transmit diversity refers to transmission of data redundantly from multiple transmit antennas to improve the reliability of the data transmission. A propagation path may exist between each transmit antenna and a receive antenna. The propagation paths for the multiple transmit antennas may experience different channel conditions, e.g., different fading, multipath, and interference effects. Sending the data transmission from the multiple transmit antennas may thus improve the likelihood of receiving the data transmission via at least one good propagation path. It may be desirable to support transmit diversity while retaining other pertinent signal characteristics, as described below.

SUMMARY

Techniques for transmitting data from two transmit antennas in a single SC-FDMA symbol period to achieve full transmit diversity while maintaining a single-carrier waveform for each transmit antenna are described herein. The techniques may be used by a user equipment (UE) for transmission on the uplink and by a base station for transmission on the downlink.

In one design, a transmitter (e.g., a UE) may form a first symbol vector comprising a first modulation symbol sequence and a second modulation symbol sequence. The transmitter may also form a second symbol vector comprising a third modulation symbol sequence and a fourth modulation symbol sequence. The third and fourth modulation symbol sequences may be generated based on the second and first modulation symbol sequences, respectively. Each symbol vector may further include a cyclic prefix and possibly a cyclic postfix for each modulation symbol sequence. The transmitter may generate a first SC-FDMA symbol based on the first symbol vector and a second SC-FDMA symbol based on the second symbol vector. The transmitter may transmit the first and second SC-FDMA symbols from first and second transmit antennas, respectively, in a single SC-FDMA symbol period to achieve transmit diversity. A receiver (e.g., a base station) may perform SC-FDMA demodulation and symbol detection to recover the first and second modulation symbol sequences from the transmitter.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. The system bandwidth may correspond to a subset of the K total subcarriers, and the remaining subcarriers may be used as guard band. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 1:
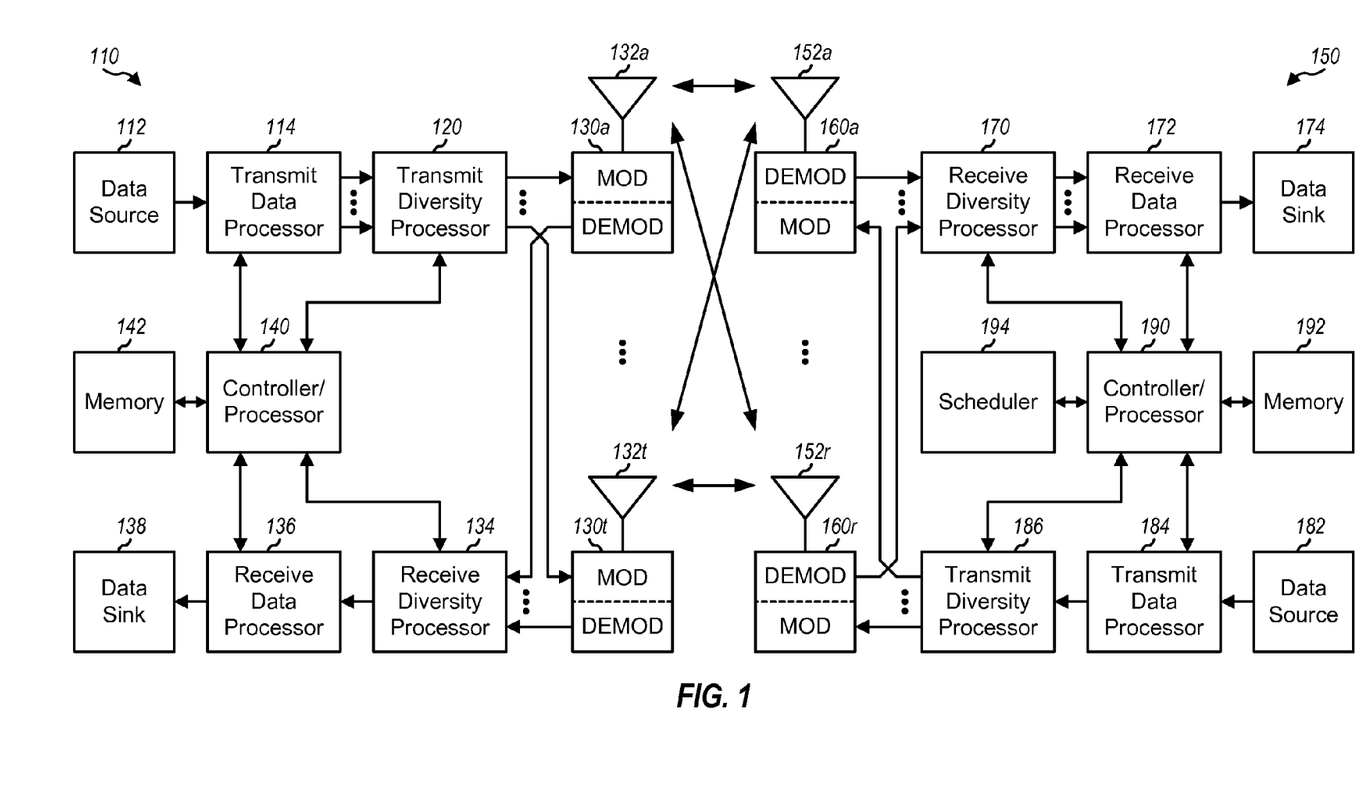
FIG. 1 shows a block diagram of a UE and a base station.

FIG. 1 shows a block diagram of a design of a UE 110 and an evolved Node B (eNB) 150 in a wireless system, which may be an LTE system or some other system. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. An eNB may be a station that communicates with the UEs and may also be referred to as a base station, a Node B, an access point, etc. In the design shown in FIG. 1, UE 110 is equipped with T antennas 132a through 132t, and eNB 150 is equipped with R antennas 152a through 152r, where in general T>1 and R≥1.

At UE 110, a transmit data processor 114 may receive traffic data from a data source 112, process (e.g., encode, interleave, and modulate) the traffic data based on one or more modulation and coding schemes, and provide data symbols. Processor 114 may also process control data from a controller/processor 140 and provide control symbols. Processor 114 may further generate reference symbols for a reference signal or pilot. A transmit diversity processor 120 may receive modulation symbols, which may include the data symbols, the control symbols, and/or the reference symbols. Processor 120 may perform transmit diversity on the modulation symbols if enabled, and may provide T output symbol streams to T modulators (MODs) 130a through 130t. Each modulator 130 may process a respective output symbol stream (e.g., for SC-FDMA) to obtain an output sample stream. Each modulator 130 may further process (e.g., convert to analog, amplify, filter, and upconvert) the output sample stream to obtain an uplink signal. T uplink signals from modulators 130a through 130t may be transmitted via T antennas 132a through 132t, respectively.

At eNB 150, antennas 152a through 152r may receive the uplink signals from UE 110 and provide received signals to demodulators (DEMODs) 160a through 160r, respectively. Each demodulator 160 may condition (e.g., filter, amplify, downconvert, and digitize) a respective received signal to obtain received samples. Each demodulator 160 may further process the received samples (e.g., for SC-FDMA) to obtain input samples. A receive diversity processor 170 may receive input samples from all R demodulators 160a through 160r, process the input samples in a manner complementary to processing by transmit diversity processor 120, and provide modulation symbol estimates. A receive data processor 172 may process (e.g., demodulate, deinterleave, and decode) the modulation symbol estimates, provide decoded traffic data to a data sink 174, and provide decoded control data to a controller/processor 190.

On the downlink, at eNB 150, traffic data from a data source 182 and control data from controller/processor 190 may be processed by a transmit data processor 184 and a transmit diversity processor 186, conditioned by modulators 160a through 160r, and transmitted to UE 110. At UE 110, the downlink signals from eNB 150 may be received by antennas 132, conditioned by demodulators 130, processed by a receive diversity processor 134 and further processed by a receive data processor 136 to obtain the traffic data and control data sent to UE 110.

Controllers/processors 140 and 190 may direct the operation at UE 110 and eNB 150, respectively. Memories 142 and 192 may store data and program codes for UE 110 and eNB 150, respectively. A scheduler 194 may schedule UEs for data transmission and may assign resources to the scheduled UEs.

UE 110 may transmit traffic data and/or control data on the uplink with open loop transmit diversity (OLTD), which may also be referred to as simply transmit diversity. For OLTD, UE 110 may transmit data from multiple transmit antennas to one or more receive antennas at eNB 150 without using any feedback information from eNB 150. For simplicity, much of the description herein is for data transmission with transmit diversity from two transmit antennas at UE 110 to one receive antenna at eNB 150.

In an aspect, a transmit diversity scheme may be used to transmit data from two transmit antennas in a single SC-FDMA symbol period to achieve full transmit diversity while maintaining a single-carrier waveform for each transmit antenna. This transmit diversity scheme may be referred to as one-symbol space-time block code (STBC) scheme. A single-carrier waveform may be obtained by sending data on a set of contiguous subcarriers using SC-FDMA. A single-carrier waveform may have a lower peak-to-average-power ratio (PAPR), which may be desirable. For example, the lower PAPR may allow UE 110 to operate its power amplifiers with a smaller back-off, which may improve efficiency and allow for a higher peak output power. The improved efficiency may extend battery life, and the higher peak output power may be desirable for a power-limited UE, e.g., a UE at the edge of coverage.

Figure 2:
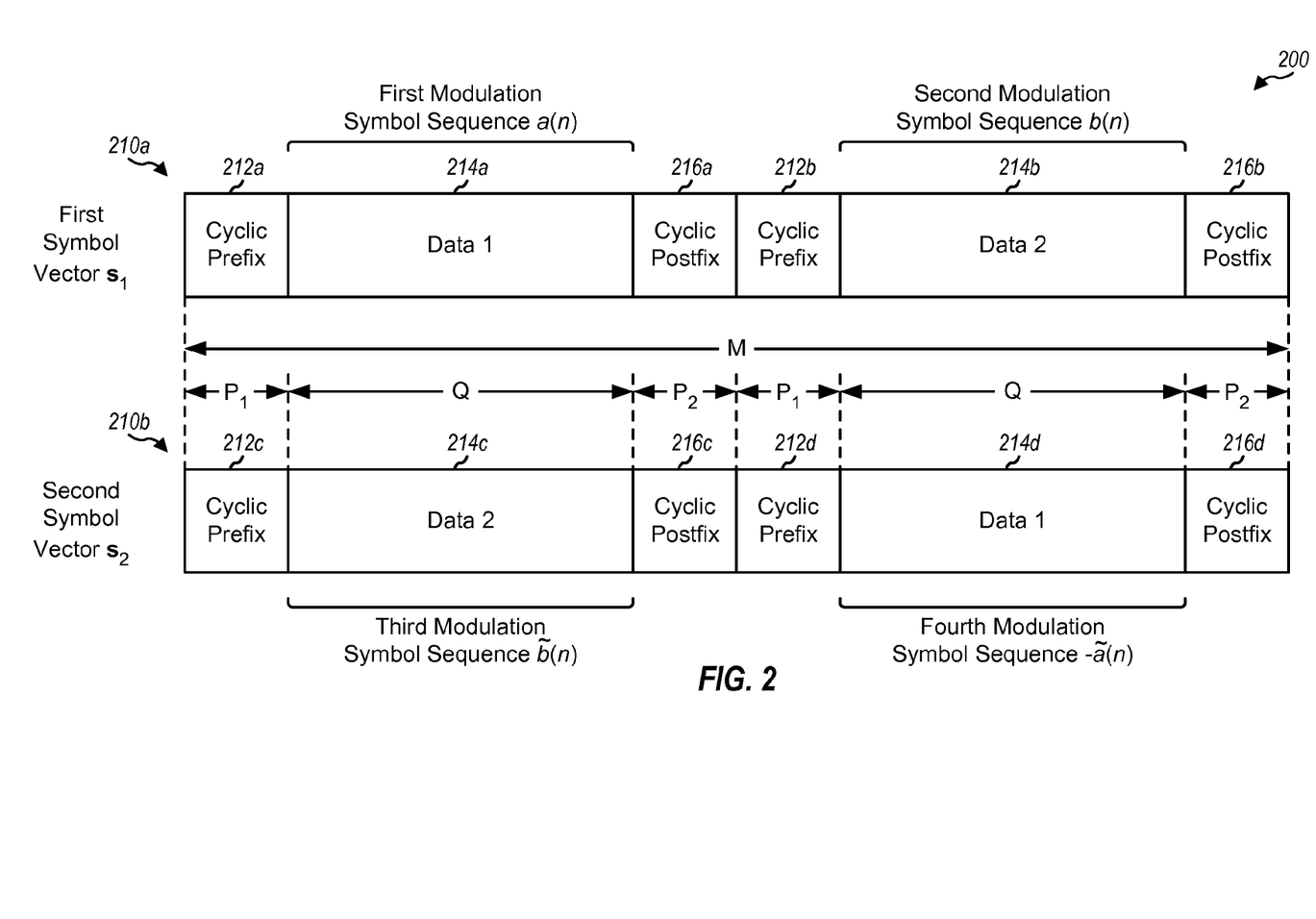
FIG. 2 shows an exemplary signal structure for two transmit antennas.

FIG. 2 shows a design of a signal structure 200 for the one-symbol STBC scheme. A first symbol vector $s_1$ for a first transmit antenna may include M modulation symbols and may have a format 210a. M is the number of subcarriers used for transmission and may be any integer value. A vector may include a group of symbols and may be represented in a particular format, e.g., a row or a column. The first symbol vector may include a first part comprising a first modulation symbol sequence a(n) and a second part comprising a second modulation symbol sequence b(n). A second symbol vector $s_2$ for a second transmit antenna may also include M modulation symbols and may have a format 210b. The second symbol vector may include a first part comprising a third modulation symbol sequence b̃(n) and a second part comprising a fourth modulation symbol sequence −ã(n). Each part may include a cyclic prefix 212 comprising $P_1$ modulation symbols, followed by a data portion 214 comprising Q modulation symbols in the modulation symbol sequence, followed by a cyclic postfix 216 comprising $P_2$ modulation symbols. The cyclic prefix length $P_1$ and the cyclic postfix length $P_2$ may be selected based on the delay spread of a wireless channel, as described below. The length of each symbol vector may be M=2 (Q+$P_1$+$P_2$).

The first and second symbol vectors may be expressed as:

$$s_1 = [s_1(0), \ldots, s_1(M-1)] \quad \text{Eq (1)}$$

$$= \begin{bmatrix} \underbrace{a(Q-P_1), \ldots, a(Q-1)}_{P_1 \text{ Modulation Symbols}}, & \underbrace{a(0), \ldots, a(Q-1)}_{Q \text{ Modulation Symbols}}, \\ \underbrace{a(0), \ldots, a(P_2-1)}_{P_2 \text{ Modulation Symbols}}, & \underbrace{b(Q-P_1), \ldots, b(Q-1)}_{P_1 \text{ Modulation Symbols}}, \\ \underbrace{b(0), \ldots, b(Q-1)}_{Q \text{ Modulation Symbols}}, & \underbrace{b(0), \ldots, b(P_2-1)}_{P_2 \text{ Modulation Symbols}} \end{bmatrix}$$

$$s_2 = [s_2(0), \ldots, s_2(M-1)] \quad \text{Eq (2)}$$

$$= \begin{bmatrix} \underbrace{\tilde{b}(Q-P_1), \ldots, \tilde{b}(Q-1)}_{P_1 \text{ Modulation Symbols}}, & \underbrace{\tilde{b}(0), \ldots, \tilde{b}(Q-1)}_{Q \text{ Modulation Symbols}}, \\ \underbrace{\tilde{b}(0), \ldots, \tilde{b}(P_2-1)}_{P_2 \text{ Modulation Symbols}}, & \underbrace{-\tilde{a}(Q-P_1), \ldots, -\tilde{a}(Q-1)}_{P_1 \text{ Modulation Symbols}}, \\ \underbrace{-\tilde{a}(0), \ldots, -\tilde{a}(Q-1)}_{Q \text{ Modulation Symbols}}, & \underbrace{-\tilde{a}(0), \ldots, -\tilde{a}(P_2-1)}_{P_2 \text{ Modulation Symbols}} \end{bmatrix}$$

where
$\tilde{a}(n) = a^*((-n) \bmod Q)$,
$\tilde{b}(n) = b^*((-n) \bmod Q)$,
"mod" denotes a modulo operation, and
"*" denotes a complex conjugate.

As shown in equation (1), the first symbol vector $s_1$ may include the first modulation symbol sequence a(n) of length Q, the second modulation symbol sequence b(n) of length Q, and cyclic prefixes and postfixes. As shown in equation (2), the second symbol vector $s_2$ may include the third modulation symbol sequence $\tilde{b}(n)$ of length Q, the fourth modulation symbol sequence $-\tilde{a}(n)$ of length Q, and cyclic prefixes and postfixes. Modulation symbol sequences $-\tilde{a}(n)$ and $\tilde{b}(n)$ may be inversed, cyclically shifted, and conjugated versions of modulation symbol sequences a(n) and b(n), respectively. The signal structure in FIG. 2 and equations (1) and (2) can provide full transmit diversity and maintain a single-carrier waveform for each transmit antenna, as described below.

The design shown in FIG. 2 and equations (1) and (2) effectively split one SC-FDMA symbol into two shorter single-carrier symbols in the time domain. The cyclic prefix length $P_1$, the cyclic postfix length $P_2$, and the overhead of $2(P_1+P_2)/M$ may be flexibly configured based on the channel delay spread and desired performance. $P_1$ and $P_2$ may be configured semi-statically via Layer 3 signaling or dynamically via signaling on a control channel, e.g., a Physical Downlink Control Channel (PDCCH) in LTE. $P_1$ and $P_2$ may also be implicitly tied to a related system parameter such as a normal cyclic prefix length, an extended cyclic prefix length, single frequency network (SFN), etc. For example, $P_1$ may be equal to a first value for the normal cyclic prefix, a second value for the extended cyclic prefix, a third value for SFN, etc.

Figure 3:
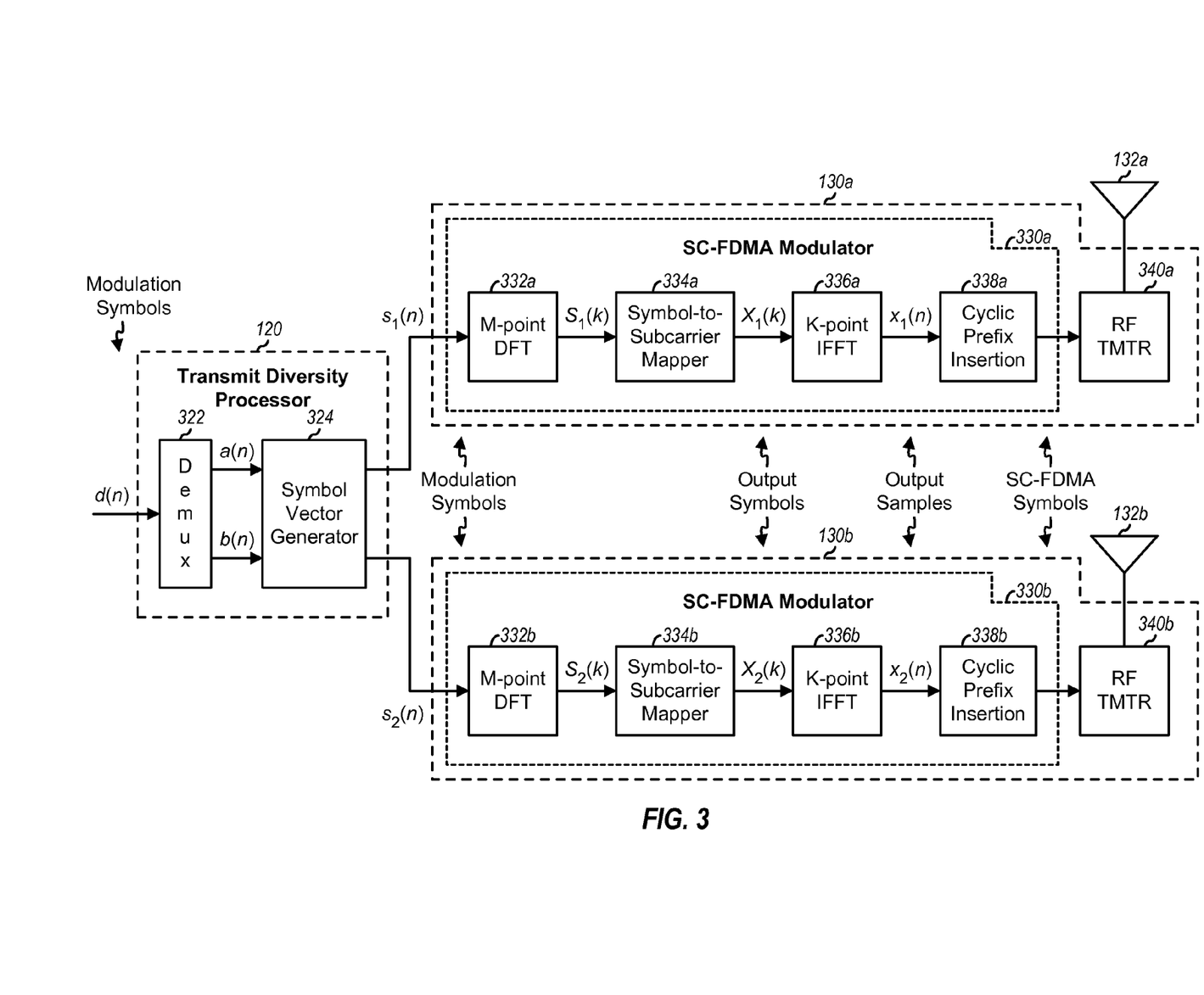
FIG. 3 shows a design of a transmit diversity processor and two modulators.

FIG. 3 shows a block diagram of a design of transmit diversity processor 120 and two modulators 130a and 130b at UE 110 for data transmission on the uplink with transmit diversity. Transmit diversity processor 120 may receive modulation symbols d(n), which may comprise data symbols, control symbols, etc. Each modulation symbol may be a real or complex value and may be obtained based on a modulation scheme (e.g., QPSK, QAM, etc.), a real or complex-valued sequence, etc. Within processor 120, a demultiplexer (Demux) 322 may demultiplex the modulation symbols d(n) into modulation symbol sequences a(n) and b(n) of length Q. A symbol vector generator 324 may receive modulation symbol sequences a(n) and b(n), generate symbol vectors $s_1$ and $s_2$ for the two transmit antennas as shown in equations (1) and (2), and provide symbol vectors $s_1$ and $s_2$ to modulators 130a and 130b, respectively.

In the design shown in FIG. 3, each modulator 130 includes an SC-FDMA modulator 330 and a radio frequency (RF) transmitter (TMTR) 340. Within SC-FDMA modulator 330a, a discrete Fourier transform (DFT) unit 332a may receive the first symbol vector $s_1$ and perform an M-point DFT on the M modulation symbols in symbol vector $s_1$ to obtain M frequency-domain symbols $S_1(k)$. The terms DFT and fast Fourier transform (FFT) are used interchangeably herein, and the terms inverse DFT (IDFT) and inverse FFT (IFFT) are also used interchangeably herein. A symbol-to-subcarrier mapper 334a may map the M frequency-domain symbols to M consecutive subcarriers used for transmission, map zero symbols with signal value of zero to remaining subcarriers, and provide K output symbols $X_1(k)$ for the K total subcarriers. An IFFT unit 336a may perform a K-point IFFT on the K output symbols and provide K time-domain output samples $x_1(n)$ for a useful portion. A cyclic prefix insertion unit 338a may copy the last C output samples of the useful portion and append the copied samples to the front of the useful portion to form an SC-FDMA symbol comprising K+C output samples. The SC-FDMA symbol may be processed by RF transmitter 340a and transmitted via antenna 132a in one SC-FDMA symbol period (or simply, a symbol period), which may cover K+C sample periods. Modulator 130b may similarly process the second symbol vector $s_2$ to obtain another SC-FDMA symbol for transmission via antenna 132b.

Figure 4:
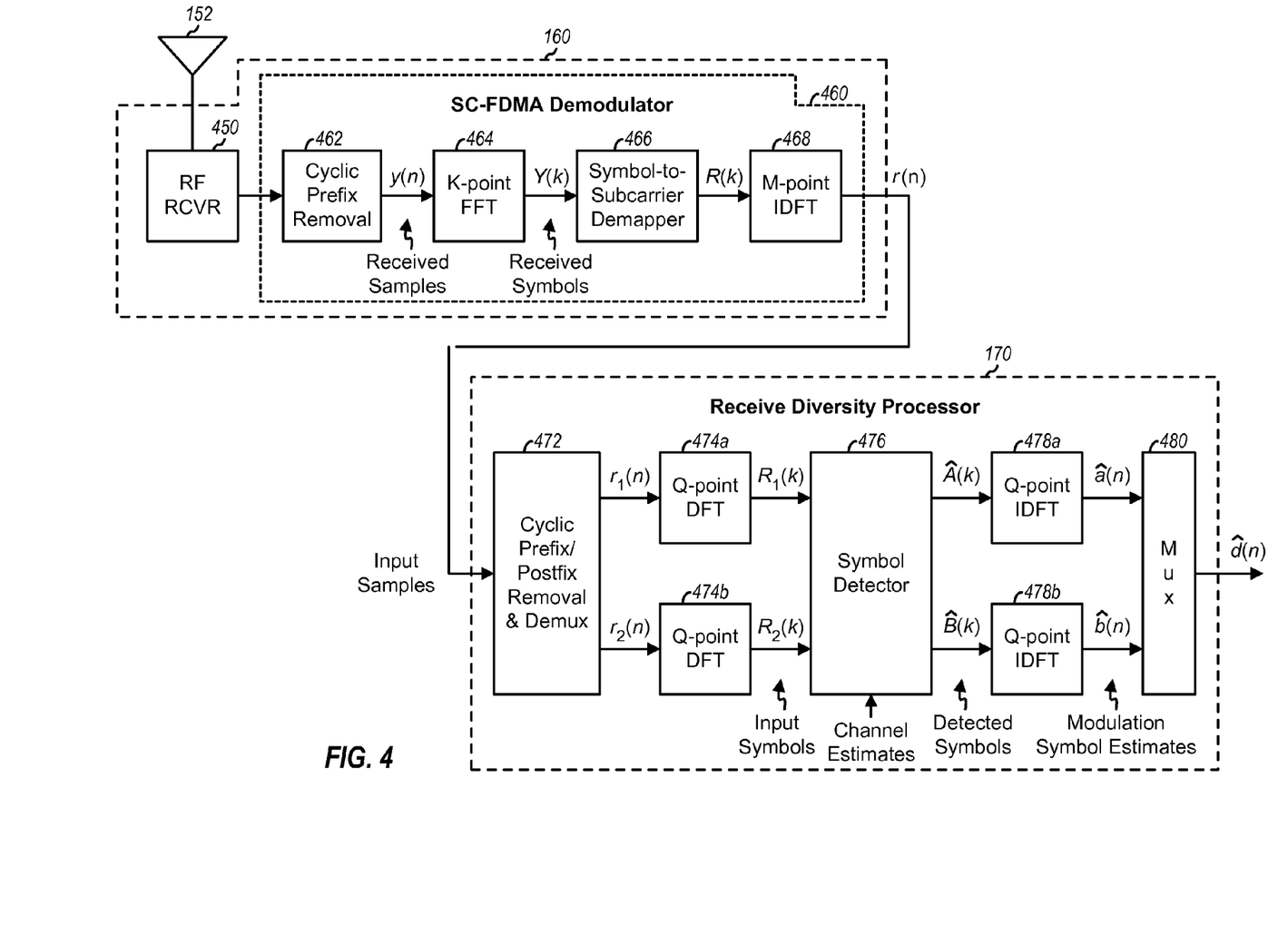
FIG. 4 shows a design of a demodulator and a receive diversity processor.

FIG. 4 shows a block diagram of a design of one demodulator 160 and receive diversity processor 170 at eNB 150 for data transmission on the uplink with transmit diversity. Receive antenna 152 at eNB 150 may receive the uplink signals from transmit antennas 132a and 132b at UE 110 and may provide a received signal to demodulator 160. In the design shown in FIG. 4, demodulator 160 includes an RF receiver (RCVR) 450 and an SC-FDMA demodulator 460. RF receiver 450 may process the received signal and provide received samples to SC-FDMA demodulator 460. Within SC-FDMA demodulator 460, a cyclic prefix removal unit 462 may remove the cyclic prefix in a received SC-FDMA symbol and provide K received samples y(n) for the useful portion. An FFT unit 464 may perform a K-point FFT on the K received samples and provide K received symbols Y(k) for the K total subcarriers. A symbol-to-subcarrier demapper 466 may obtain the K received symbols for the K total subcarriers, provide M received symbols R(k) for the M subcarriers used for transmission, and discard the remaining received symbols. An IDFT unit 468 may transform the M received symbols R(k) with an M-point IDFT and provide M time-domain input samples r(n) to receive diversity processor 170.

The received samples y(n) from cyclic prefix removal unit 462 may be expressed as:

$$y(n) = h_1(n) \otimes_K x_1(n) + h_2(n) \otimes_K x_2(n) + w(n), \quad \text{Eq (3)}$$

where
$x_1(n)$ and $x_2(n)$ are output samples from IFFT units 336a and 336b in FIG. 3,
$h_1(n)$ and $h_2(n)$ are discrete-time channel impulse responses of equivalent channels for transmit antennas 132a and 132b, respectively,
w(n) denotes the noise and interference observed by eNB 150, and
$\otimes_K$ denotes a K-point circular convolution operation.

The equivalent channel for each transmit antenna 132 may include the actual channel from that transmit antenna to receive antenna 152 as well as the effects of RF transmitter 340 at UE 110 and RF receiver 450 at eNB 150. The channel impulse response for each transmit antenna may include L time-domain taps, where L may be much less than the total number of subcarriers, or L<<K.

The received symbols Y(k) from FFT unit 464 may be expressed as:

$$Y(k)=H_1(k)\cdot X_1(k)+H_2(k)\cdot X_2(k)+W(k), \text{ for } k=0,\ldots,K-1, \quad \text{Eq (4)}$$

where $X_1(k)$, $X_2(k)$, $H_1(k)$, $H_2(k)$ and $W(k)$ are K-point FFTs of $x_1(n)$, $x_2(n)$, $h_1(n)$, $h_2(n)$ and $w(n)$, respectively.

Within receive diversity processor 170, a unit 472 may obtain M input samples r(n) from SC-FDMA demodulator 460 and may provide two sample vectors $r_1$ and $r_2$ of length Q, which may be expressed as:

$$r_1 = [r_1(0), \ldots, r_1(Q-1)] \quad \text{Eq (5)}$$
$$= [r(P_1), r(P_1+1), \ldots, r(P_1+Q-1)],$$

and $$r_2 = [r_2(0), \ldots, r_2(Q-1)] \quad \text{Eq (6)}$$
$$= \begin{bmatrix} r(2P_1+P_2+Q), \\ r(2P_1+P_2+Q+1), \ldots, r(2P_1+P_2+2Q-1) \end{bmatrix}.$$

As shown in equation (5), unit 472 may discard the first $P_1$ input samples in r(n) corresponding to cyclic prefix 212a in FIG. 2 and may provide the next Q input samples corresponding to data portion 214a as sample vector $r_1$. As shown in equation (6), unit 472 may further discard the next $(P_1+P_2)$ input samples corresponding to cyclic postfix 216a and cyclic prefix 212b in FIG. 2 and may provide the next Q input samples corresponding to data portion 214b as sample vector $r_2$. The cyclic prefix length $P_1$ and the cyclic postfix length $P_2$ may be selected to be sufficiently long, e.g., $P_1 \geq \lfloor L \cdot M/K+1 \rfloor$ and $P_2 \geq 1$. In this case, the input samples in equations (5) and (6) may be expressed as:

$$r_1(n)=\bar{h}_1(n)\otimes_Q a(n)+\bar{h}_2(n)\otimes_Q b(n)+w_1(n), \quad \text{and Eq (7)}$$

$$r_2(n)=\bar{h}_1(n)\otimes_Q b(n)-\bar{h}_2(n)\otimes_Q \tilde{a}(n)+w_2(n), \quad \text{Eq (8)}$$

where
$\bar{h}_1(n)$ and $\bar{h}_2(n)$ are shortened channel impulse responses for transmit antennas 132a and 132b, respectively,
$w_1(n)$ and $w_2(n)$ denote the noise and interference observed by input samples $r_1(n)$ and $r_2(n)$, respectively, and
$\otimes_Q$ denotes a Q-point circular convolution operation/.

The shortened channel impulse responses $\bar{h}_1(n)$ and $\bar{h}_1(n)$ may be obtained as follows. The channel impulse responses $h_1(n)$ and $h_2(n)$ may be extended to length K (e.g., with zero padding) and then transformed with K-point FFTs to obtain channel frequency responses $H_1(k)$ and $H_2(k)$, respectively. A channel frequency response $H'_1(k)$ may be formed with M channel gains in $H_1(k)$ for the M subcarriers used for transmission. Similarly, a channel frequency response $H'_2(k)$ may be formed with M channel gains in $H_2(k)$ for the M subcarriers used for transmission. The channel frequency responses $H'_1(k)$ and $H'_2(k)$ may be transformed with M-point DFTs to obtain M-tap channel impulse responses $h'_1(n)$ and $h'_2(n)$, respectively. In one design, the shortened channel impulse responses $\bar{h}_1(n)$ and $\bar{h}_2(n)$ may be formed as follows:

$$[\bar{h}_1(0), \ldots, \bar{h}_1(Q-1)] = \quad \text{Eq (9)}$$
$$[h'_1(0), \ldots, h'_1(\upsilon), \underbrace{0, \ldots, 0}_{Q-\upsilon-2}, h'_1(M-1)],$$

and $$[\bar{h}_2(0), \ldots, \bar{h}_2(Q-1)] = \quad \text{Eq (10)}$$
$$[h'_2(0), \ldots, h'_2(\upsilon), \underbrace{0, \ldots, 0}_{Q-\upsilon-2}, h'_2(M-1)],$$

where $\upsilon = \lfloor L \cdot M/K+1 \rfloor$. The rightmost channel taps $h'_1(M-1)$ and $h'_2(M-1)$ may have a fair amount of energy due to windowing of $H_1(k)$ and $H_2(k)$ with a rectangular window to obtain $H'_1(k)$ and $H'_2(k)$, respectively.

In another design, Q circularly consecutive taps with the most energy in the channel impulse responses $h'_1(n)$ and $h'_2(n)$ may be used as the shortened channel impulse responses $\bar{h}_1(n)$ and $\bar{h}_2(n)$, respectively. The shortened channel impulse responses $\bar{h}_1(n)$ and $\bar{h}_2(n)$ may also be obtained in other manners.

A DFT unit 474a may perform a Q-point DFT on the Q input samples $r_1(n)$ in vector $r_1$ and provide Q input symbols $R_1(k)$. Similarly, a DFT unit 474b may perform a Q-point DFT on the Q input samples $r_2(n)$ in vector $r_2$ and provide Q input symbols $R_2(k)$. The input symbols $R_1(k)$ and $R_2(k)$ may be expressed as:

$$R_1(k)=\bar{H}_1(k)\cdot A(k)+\bar{H}_2(k)\cdot B^*(k)+W_1(k), \quad \text{and Eq (11)}$$

$$R_2(k)=\bar{H}_1(k)\cdot B(k)-\bar{H}_2(k)\cdot A^*(k)-W_2(k), \quad \text{Eq (12)}$$

where A(k), B(k), $\bar{H}_1(k)$, $\bar{H}_2(k)$, $W_1(k)$ and $W_2(k)$ are Q-point DFTs of a(n), b(n), $\bar{h}_1(n)$, $\bar{h}_2(n)$, $w_1(n)$ and $w_2(n)$, respectively.

A symbol detector 476 may receive the input symbols $R_1(k)$ and $R_2(k)$ and the shortened channel frequency responses $\bar{H}_1(k)$ and $\bar{H}_2(k)$. In one design, symbol detector 476 may perform symbol detection as follows:

$$\hat{A}(k) = \bar{H}_1^*(k)\cdot R_1(k) - \bar{H}_2(k)\cdot R_2^*(k) \quad \text{Eq (13)}$$
$$= (|\bar{H}_1(k)|^2 + |\bar{H}_2(k)|^2)\cdot A(k) + \bar{H}_1^*(k)\cdot W_1(k) - \bar{H}_2(k)\cdot W_2^*(k)$$

$$\hat{B}(k) = \bar{H}_2(k)\cdot R_1^*(k) + \bar{H}_1^*(k)\cdot R_2(k) \quad \text{Eq (14)}$$
$$= (|\bar{H}_1(k)|^2 + |\bar{H}_2(k)|^2)\cdot B(k) + \bar{H}_2(k)\cdot W_1^*(k) - \bar{H}_1^*(k)\cdot W_2(k)$$

where $\hat{A}(k)$ and $\hat{B}(k)$ are detected symbols, which are estimates of transmitted symbols A(k) and B(k), respectively.

As shown in equations (13) and (14), dual diversity may be achieved, and the detected symbols may be equal to the transmitted symbols scaled by $(|\bar{H}_1(k)|^2+|\bar{H}_2(k)|^2)$ and degraded by noise. Furthermore, dual diversity may be achieved for data transmission in a single SC-FDMA symbol period while maintaining a single-carrier waveform for each transmit antenna.

In another design, symbol detector 476 may perform symbol detection based on minimum mean square error (MMSE) as follows:

$$\hat{A}(k) = \frac{G(k)\cdot P(k)}{G^2(k)\cdot P(k) + N(k)} \cdot [\bar{H}_1^*(k)\cdot R_1(k) - \bar{H}_2(k)\cdot R_2^*(k)], \quad \text{Eq (15)}$$

and

-continued $$\hat{B}(k) = \frac{G(k) \cdot P(k)}{G^2(k) \cdot P(k) + N(k)} \cdot [\overline{H}_2(k) \cdot R_1^*(k) + \overline{H}_1^*(k) \cdot R_2(k)], \quad \text{Eq (16)}$$

where $G(k) = (|\overline{H}_1(k)|^2 + |\overline{H}_2(k)|^2)$,

P(k) is the signal power of A(k) and B(k), and

N(k) is the noise power of the noise term in equation (13) and (14).

Symbol detection may also be performed in other manners. In any case, an IDFT unit 478a may perform a Q-point IDFT on the Q detected symbols Â(k) and provide Q modulation symbol estimates â(n). Similarly, an IDFT unit 478b may perform a Q-point IDFT on the Q detected symbols B̂(k) and provide Q modulation symbol estimates b̂(n). A multiplexer (Mux) 480 may multiplex the modulation symbol estimates â(n) and b̂(n) and provide modulation symbol estimates d̂(n), which are estimates of the transmitted modulation symbols d(n).

FIG. 4 shows a specific design of performing symbol detection in the frequency domain for the one-symbol STBC scheme. Symbol detection may also be performed in other manners.

For simplicity, FIG. 4 shows a design in which eNB 150 includes a single receive antenna. Multiple receive antennas may also be used to receive a data transmission sent with transmit diversity by UE 110. In this case, eNB 150 may obtain detected symbols Â_r(k) and B̂_r(k) for each receive antenna r at the eNB, e.g., as described above. eNB 150 may then weight and combine the detected symbols for all receive antennas to obtain final detected symbols Â(k) and B̂(k), which may be further processed to recover the transmitted data.

The one-symbol STBC scheme described herein may be used for each SC-FDMA symbol in which transmit diversity is desired. The one-symbol STBC scheme may also be used in conjunction with one or more other transmit diversity schemes.

Figure 5:
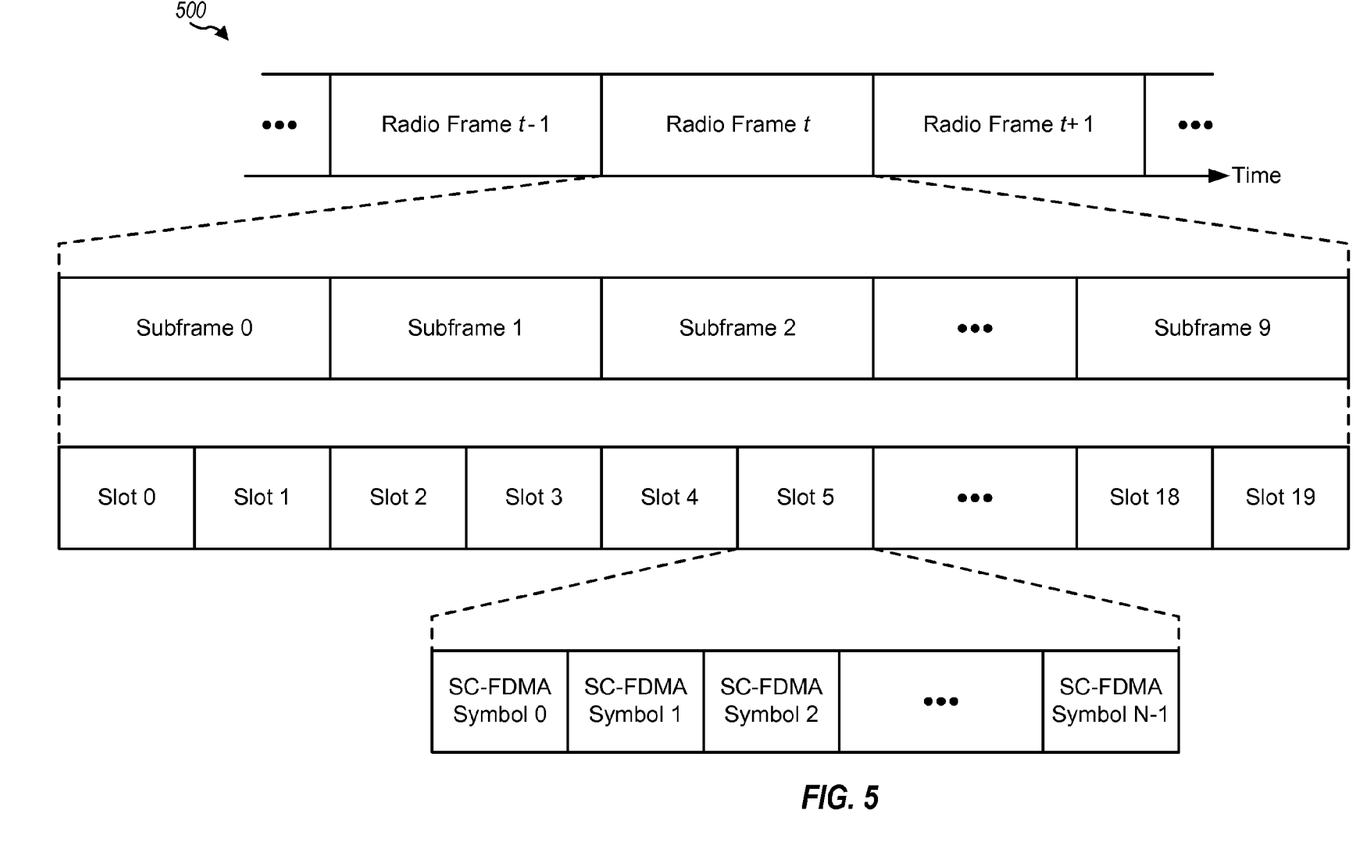
FIG. 5 shows an exemplary frame structure.

FIG. 5 shows a frame structure 500 used in LTE. The transmission timeline may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 to 19. Each slot may include N symbol periods, where N may be equal to 6 for the extended cyclic prefix or 7 for the normal cyclic prefix.

Figure 6A:
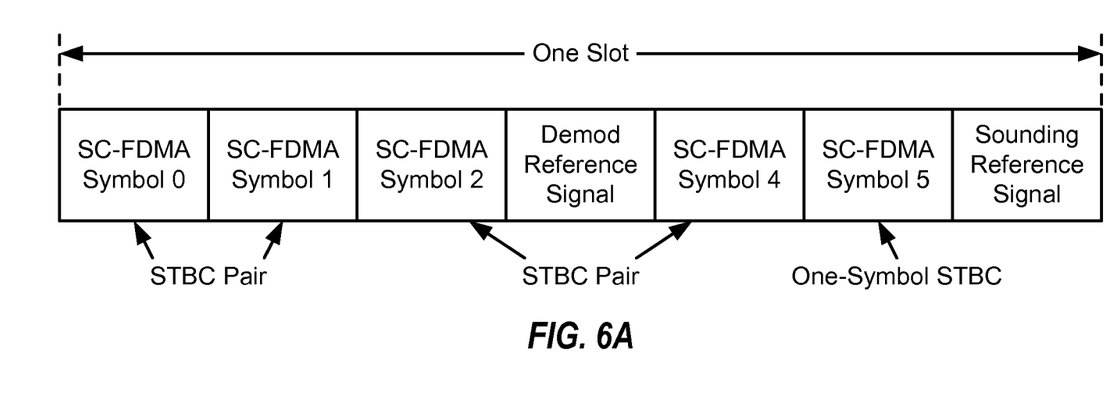
FIGS. 6A and 6B show two designs of sending data with transmit diversity.

FIG. 6A shows a design of sending data with transmit diversity in one slot of seven symbol periods with the normal cyclic prefix. On the uplink, one SC-FDMA symbol may be sent in each symbol period. Seven SC-FDMA symbols 0 through 6 may be sent in the seven symbol periods of the slot. SC-FDMA symbols 0, 1, 2, 4 and 5 may carry data. SC-FDMA symbol 3 may carry a demodulation reference signal (DM-RS), which may be used by an eNB for channel estimation and coherent demodulation. SC-FDMA symbol 6 may carry a sounding reference signal (SRS), which may be used by the eNB to estimate channel quality. The sounding reference signal may be sent periodically in some slots, and SC-FDMA symbol 6 may carry data when the sounding reference signal is not sent.

In one design that is not shown in FIG. 6A, each SC-FDMA symbol may be generated based on the one-symbol STBC scheme. In another design that is shown in FIG. 6A, four SC-FDMA symbols may be generated based on a two-symbol STBC scheme, and one SC-FDMA symbol may be generated based on the one-symbol STBC scheme. The two-symbol STBC scheme may transmit a block of modulation symbols from two transmit antennas in two SC-FDMA symbols. As shown in FIG. 6A, SC-FDMA symbols 0 and 1 as well as SC-FDMA symbols 2 and 4 may be generated based on the two-symbol STBC scheme, and SC-FDMA symbol 5 may be generated based on the one-symbol STBC scheme. Alternatively, SC-FDMA symbols 0 and 1 as well as SC-FDMA symbols 4 and 5 may be generated based on the two-symbol STBC scheme, and SC-FDMA symbol 2 may be generated based on the one-symbol STBC scheme (not shown in FIG. 6A).

Figure 6B:
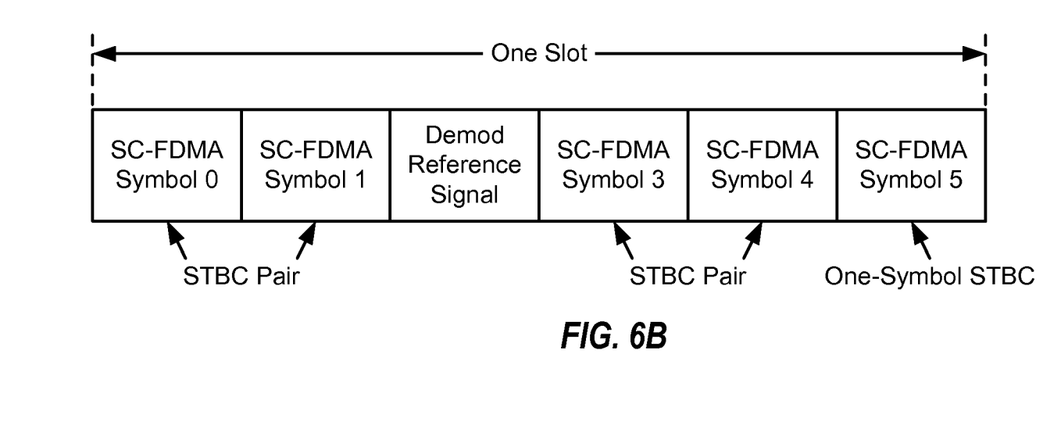

FIG. 6B shows a design of sending data with transmit diversity in one slot of six symbol periods with the extended cyclic prefix. Six SC-FDMA symbols 0 through 5 may be sent in the six symbol periods of the slot. SC-FDMA symbols 0, 1, 3, 4 and 5 may carry data, and SC-FDMA symbol 3 may carry a demodulation reference signal.

In one design that is not shown in FIG. 6B, each SC-FDMA symbol may be generated based on the one-symbol STBC scheme. In another design that is shown in FIG. 6B, four SC-FDMA symbols may be generated based on the two-symbol STBC scheme, and one SC-FDMA symbol may be generated based on the one-symbol STBC scheme. As shown in FIG. 6B, SC-FDMA symbols 0 and 1 as well as SC-FDMA symbols 3 and 4 may be generated based on the two-symbol STBC scheme, and SC-FDMA symbol 5 may be generated based on the one-symbol STBC scheme. Alternatively, SC-FDMA symbols 0 and 1 as well as SC-FDMA symbols 4 and 5 may be generated based on the two-symbol STBC scheme, and SC-FDMA symbol 3 may be generated based on the one-symbol STBC scheme (not shown in FIG. 6B).

FIGS. 6A and 6B show two scenarios in which the one-symbol STBC scheme may be used for an orphan SC-FDMA symbol when there is an odd number of SC-FDMA symbols for data. The one-symbol STBC scheme may also be used for an orphan SC-FDMA symbol in other scenarios. The one-symbol STBC scheme may also be used for each SC-FDMA symbol or for certain SC-FDMA symbols regardless of the number of SC-FDMA symbols.

The one-symbol STBC scheme described herein may provide certain advantages over other transmit diversity schemes. For example, the one-symbol STBC scheme may be preferred over a space-frequency block code (SFBC) scheme, the two-symbol STBC scheme, etc. The SFBC scheme can maintain a single-carrier waveform on one transmit antenna but not the other transmit antenna. The two-symbol STBC scheme can maintain a single-carrier waveform on each transmit antenna but transmits data on a pair of SC-FDMA symbols, which may not be available when there is an odd number of SC-FDMA symbols, e.g., as shown FIGS. 6A and 6B. The one-symbol STBC scheme can operate over a single SC-FDMA symbol period, achieve full transmit diversity, and maintain a single-carrier waveform for each transmit antenna. The one-symbol STBC scheme can also provide performance comparable to that of the SFBC scheme and better performance than that of a frequency-switch transmit diversity (FSTD) scheme and a cyclic delay diversity (CDD) scheme.

Figure 7:
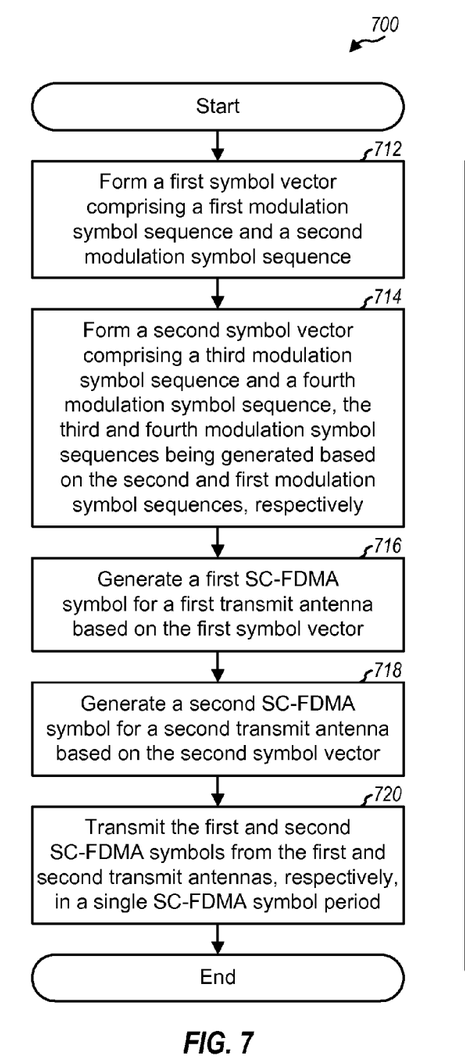
FIG. 7 shows a process for transmitting data with transmit diversity.

FIG. 7 shows a design of a process 700 for transmitting data in a wireless communication system. Process 700 may be performed by a transmitter, which may be a UE, a base station/eNB, or some other entity. The transmitter may form a first symbol vector (e.g., $s_1$) comprising a first modulation symbol sequence (e.g., a(n)) and a second modulation symbol sequence (e.g., b(n)) (block 712). The transmitter may also form a second symbol vector (e.g., $s_2$) comprising a third modulation symbol sequence (e.g., $\tilde{b}(n)$) and a fourth modulation symbol sequence (e.g., $-\tilde{a}(n)$) (block 714). The third modulation symbol sequence may be generated based on a version of (e.g., an inversed, cyclically shifted, and conjugated version of) the second modulation symbol sequence. The fourth modulation symbol sequence may be generated based on a version of (e.g., an inversed, cyclically shifted, and conjugated version of) the first modulation symbol sequence. The transmitter may generate a first SC-FDMA symbol for a first transmit antenna based on the first symbol vector (block 716). The transmitter may also generate a second SC-FDMA symbol for a second transmit antenna based on the second symbol vector (block 718). The transmitter may transmit the first SC-FDMA symbol from the first transmit antenna and the second SC-FDMA symbol from the second transmit antenna in a single symbol period to achieve transmit diversity (block 720).

In one design, the first symbol vector may further comprise a first cyclic prefix (e.g., cyclic prefix 212a in FIG. 2) for the first modulation symbol sequence and a second cyclic prefix (e.g., cyclic prefix 212b) for the second modulation symbol sequence. The second symbol vector may further comprise a third cyclic prefix (e.g., cyclic prefix 212c) for the third modulation symbol sequence and a fourth cyclic prefix (e.g., cyclic prefix 212d) for the fourth modulation symbol sequence. In one design, the first symbol vector may further comprise a first cyclic postfix (e.g., cyclic postfix 216a) for the first modulation symbol sequence and a second cyclic postfix (e.g., cyclic postfix 216b) for the second modulation symbol sequence. The second symbol vector may further comprise a third cyclic postfix (e.g., cyclic postfix 216c) for the third modulation symbol sequence and a fourth cyclic postfix (e.g., cyclic postfix 216d) for the fourth modulation symbol sequence. The cyclic prefixes may each have a first length of $P_1$, the cyclic postfixes may each have a second length of $P_2$, and the modulation symbol sequences may each have a third length of Q. In one design, the transmitter may receive signaling indicating the first and second lengths. In another design, the transmitter may determine the first and second lengths based on a system parameter, e.g., the normal cyclic prefix, the extended cyclic prefix, etc. In general, the first and second symbol vectors may or may not include cyclic prefixes and may or may not include cyclic postfixes.

In one design, the transmitter may generate a pair of SC-FDMA symbols for the first and second transmit antennas in each symbol period used for data transmission in a slot. Each pair of SC-FDMA symbols may be generated based on a respective pair of first and second modulation symbol sequences. In another design, the transmitter may generate a set of four SC-FDMA symbols for each pair of symbol periods used for data transmission in a slot, e.g., as shown in FIG. 6A or 6B. The transmitter may transmit each set of four SC-FDMA symbols from the two transmit antennas in two symbol periods of the slot. The transmitter may transmit the first and second SC-FDMA symbols from the two transmit antennas in one symbol period of the slot. The transmitter may also transmit data using some other combination of transmit diversity schemes.

Figure 8:
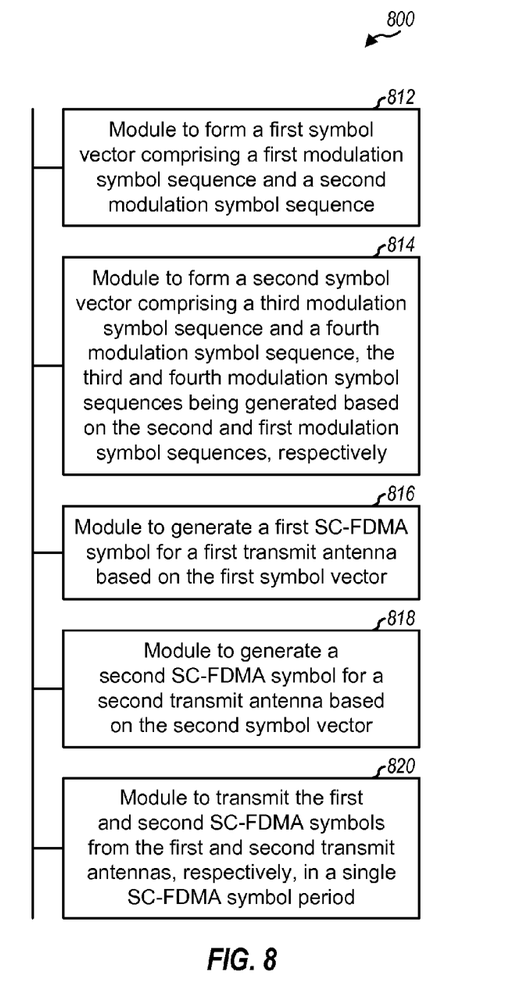
FIG. 8 shows an apparatus for transmitting data with transmit diversity.

FIG. 8 shows a design of an apparatus 800 for transmitting data in a wireless communication system. Apparatus 800 includes a module 812 to form a first symbol vector comprising a first modulation symbol sequence and a second modulation symbol sequence, a module 814 to form a second symbol vector comprising a third modulation symbol sequence and a fourth modulation symbol sequence, with the third and fourth modulation symbol sequences being generated based on the second and first modulation symbol sequences, respectively, a module 816 to generate a first SC-FDMA symbol for a first transmit antenna based on the first symbol vector, a module 818 to generate a second SC-FDMA symbol for a second transmit antenna based on the second symbol vector, and a module 820 to transmit the first and second SC-FDMA symbols from the first and second transmit antennas, respectively, in a single SC-FDMA symbol period to achieve transmit diversity.

Figures 9, 10, 11:
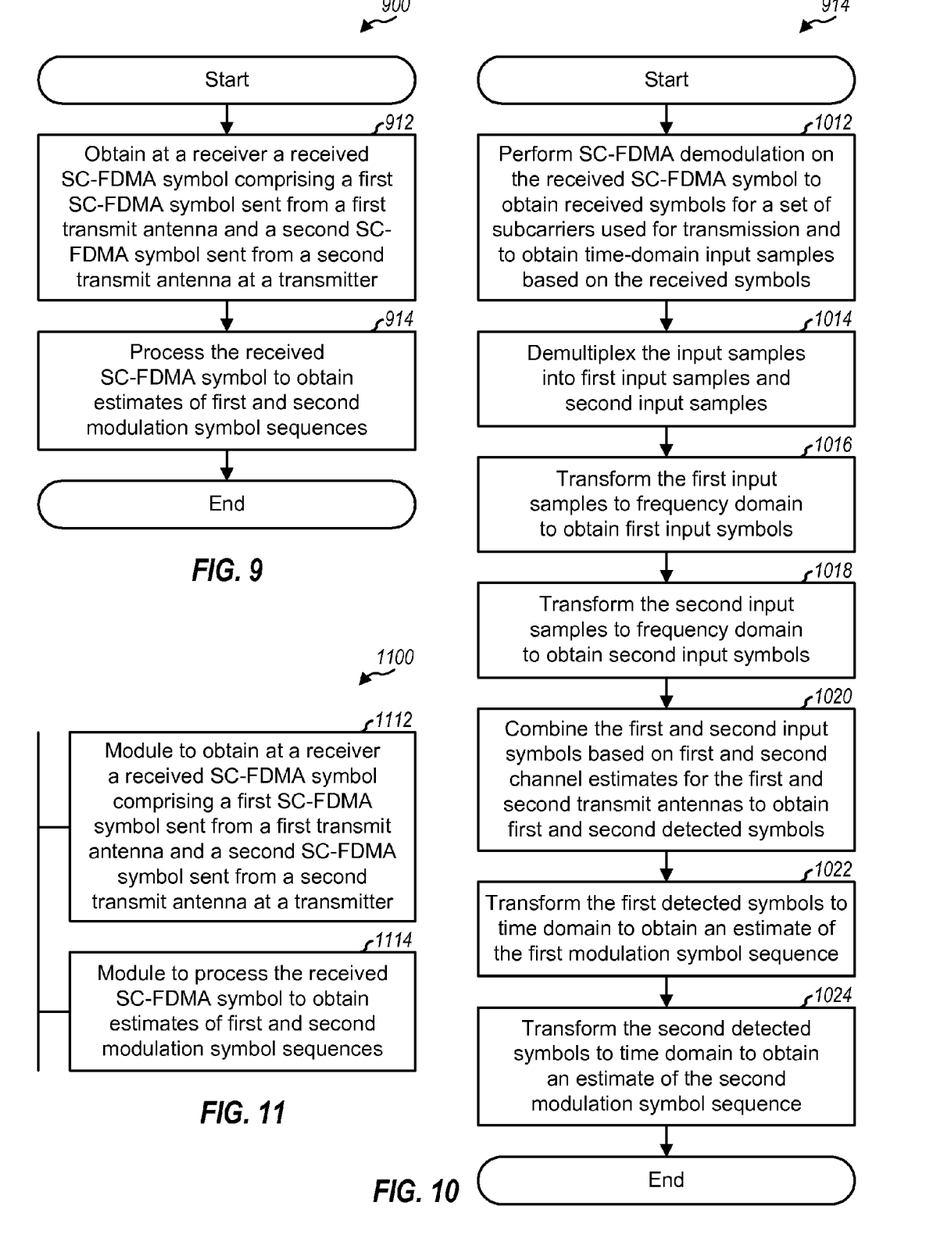
FIG. 9 shows a process for receiving data sent with transmit diversity.
FIG. 10 shows a process for performing SC-FDMA demodulation and symbol detection.
FIG. 11 shows an apparatus for receiving data sent with transmit diversity.

FIG. 9 shows a design of a process 900 for receiving data in a wireless communication system. Process 900 may be performed by a receiver, which may be a base station/eNB, a UE, or some other entity. The receiver may obtain a received SC-FDMA symbol comprising a first SC-FDMA symbol sent from a first transmit antenna and a second SC-FDMA symbol sent from a second transmit antenna at a transmitter (block 912). The first SC-FDMA symbol may be generated by the transmitter based on a first symbol vector comprising first and second modulation symbol sequences. The second SC-FDMA symbol may be generated by the transmitter based on a second symbol vector comprising third and fourth modulation symbol sequences, which may be generated based on the second and first modulation symbol sequences, respectively. The transmitter may process the received SC-FDMA symbol to obtain estimates of the first and second modulation symbol sequences (block 914).

FIG. 10 shows a design of block 914 in FIG. 9. The receiver may perform SC-FDMA demodulation on the received SC-FDMA symbol to obtain received symbols (e.g., $R(k)$) for a set of subcarriers used for transmission and to obtain time-domain input samples (e.g., $r(n)$) based on the received symbols (block 1012). The receiver may then perform symbol detection based on the input samples, a first channel estimate for the first transmit antenna, and a second channel estimate for the second transmit antenna. In one design of symbol detection, the receiver may demultiplex the input samples into first input samples (e.g., $r_1(n)$) and second input samples (e.g., $r_2(n)$), e.g., as shown in equations (5) and (6), (block 1014). The receiver may transform the first input samples to the frequency domain to obtain first input symbols (e.g., $R_1(k)$) (block 1016). The receiver may also transform the second input samples to the frequency domain to obtain second input symbols (e.g., $R_2(k)$) (block 1018).

The receiver may combine the first and second input symbols based on the first and second channel estimates to obtain first and second detected symbols (block 1020). For example, the receiver may sum (i) a first version of the first input symbols (e.g., $R_1(k)$) multiplied with a first version of the first channel estimate (e.g., $\overline{H}^*_1(k)$) and (ii) a first version of the second input symbols (e.g., $R^*_2(k)$) multiplied with a first version of the second channel (e.g., $\overline{H}_2(k)$) to obtain the first detected symbols, e.g., as shown in equation (13). The receiver may sum (i) a second version of the first input symbols (e.g., $R^*_1(k)$) multiplied with a second version of the second channel estimate (e.g., $\overline{H}_2(k)$) and (ii) a second version of the second input symbols (e.g., $R_2(k)$) multiplied with a second version of the first channel (e.g., $\overline{H}^*_1(k)$) to obtain the second detected symbols, e.g., as shown in equation (14). The receiver may also perform symbol detection in other manners, e.g., as shown in equations (15) and (16).

The receiver may transform the first detected symbols to the time domain to obtain an estimate of the first modulation symbol sequence (e.g., $\hat{a}(n)$) (block 1022). The receiver may also transform the second detected symbols to the time domain to obtain an estimate of the second modulation symbol sequence (e.g., $\hat{b}(n)$) (block 1024).

The receiver may also obtain at least one additional received SC-FDMA symbol from at least one additional receive antenna. Each additional received SC-FDMA symbol may comprise the first and second SC-FDMA symbols sent by the transmitter. The receiver may process all received SC-FDMA symbols to obtain the estimates of the first and second modulation symbol sequences. For example, the receiver may perform SC-FDMA demodulation on each received SC-FDMA symbol to obtain input samples for that SC-FDMA symbol. The receiver may then perform symbol detection based on the input samples from all received SC-FDMA symbols and channel estimates for the first and second transmit antennas to obtain the estimates of the first and second modulation symbol sequences.

FIG. 11 shows a design of an apparatus 1100 for receiving data in a wireless communication system. Apparatus 1100 includes a module 1112 to obtain at a receiver a received SC-FDMA symbol comprising a first SC-FDMA symbol sent from a first transmit antenna and a second SC-FDMA symbol sent from a second transmit antenna at a transmitter, with the first and second SC-FDMA symbols being generated by the transmitter as described above for FIG. 9, and a module 1114 to process the received SC-FDMA symbol to obtain estimates of first and second modulation symbol sequences sent in the first and second SC-FDMA symbols.

The modules in FIGS. 8 and 11 may comprise processors, electronics devices, hardware devices, electronics components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication at a wireless device, comprising:
  forming a first symbol vector comprising a first modulation symbol sequence, a second modulation symbol sequence, a first set of cyclic prefixes having a first length, and a first set of cyclic postfixes having a second length;
forming a second symbol vector comprising a third modulation symbol sequence, a fourth modulation symbol sequence, a second set of cyclic prefixes having the first length, and a second set of cyclic postfixes having the second length, the third modulation symbol sequence being generated based on the second modulation symbol sequence, and the fourth modulation symbol sequence being generated based on the first modulation symbol sequence;
generating a first single-carrier frequency division multiple access (SC-FDMA) symbol comprising the first symbol vector for a first transmit antenna;
generating a second SC-FDMA symbol comprising the second symbol vector for a second transmit antenna; and
transmitting the first SC-FDMA symbol from the first transmit antenna and the second SC-FDMA symbol from the second transmit antenna within a same SC-FDMA symbol period to achieve transmit diversity.

2. The method of claim 1, further comprising:
generating the third modulation symbol sequence based on a version of the second modulation symbol sequence; and
generating the fourth modulation symbol sequence based on a version of the first modulation symbol sequence.

3. The method of claim 1, wherein the first set of cyclic prefixes comprises a first cyclic prefix for the first modulation symbol sequence and a second cyclic prefix for the second modulation symbol sequence, and wherein the second set of cyclic prefixes comprises a third cyclic prefix for the third modulation symbol sequence and a fourth cyclic prefix for the fourth modulation symbol sequence.

4. The method of claim 3, wherein the first set of cyclic postfixes comprises a first cyclic postfix for the first modulation symbol sequence and a second cyclic postfix for the second modulation symbol sequence, and wherein the second set of cyclic postfixes comprises a third cyclic postfix for the third modulation symbol sequence and a fourth cyclic postfix for the fourth modulation symbol sequence.

5. The method of claim 4, wherein the first symbol vector comprises the first cyclic prefix, followed by the first modulation symbol sequence, followed by the first cyclic postfix, followed by the second cyclic prefix, followed by the second modulation symbol sequence, and followed by the second cyclic postfix, and wherein the second symbol vector comprises the third cyclic prefix, followed by the third modulation symbol sequence, followed by the third cyclic postfix, followed by the fourth cyclic prefix, followed by the fourth modulation symbol sequence, and followed by the fourth cyclic postfix.

6. The method of claim 1, wherein the first, second, third and fourth modulation symbol sequences each has a third length.

7. The method of claim 1, further comprising:
receiving signaling indicating the first and second lengths.

8. The method of claim 1, further comprising:
determining the first and second lengths based on a system parameter.

9. The method of claim 1, further comprising:
generating a pair of SC-FDMA symbols for the first and second transmit antennas in each symbol period used for data transmission in a slot, each pair of SC-FDMA symbols being generated based on a respective pair of first and second modulation symbol sequences.

10. The method of claim 1, further comprising:
generating a set of four SC-FDMA symbols for each pair of symbol periods used for data transmission in a slot;
transmitting each set of four SC-FDMA symbols from the first and second transmit antennas in two symbol periods of the slot; and
transmitting the first and second SC-FDMA symbols from the first and second transmit antennas in one symbol period of the slot.

11. An apparatus for wireless communication, comprising:
means for forming a first symbol vector comprising a first modulation symbol sequence, a second modulation symbol sequence, a first set of cyclic prefixes having a first length, and a first set of cyclic postfixes having a second length;
means for forming a second symbol vector comprising a third modulation symbol sequence, a fourth modulation symbol sequence, a second set of cyclic prefixes having the first length, and a second set of cyclic postfixes having the second length, the third modulation symbol sequence being generated based on the second modulation symbol sequence, and the fourth modulation symbol sequence being generated based on the first modulation symbol sequence;
means for generating a first single-carrier frequency division multiple access (SC-FDMA) symbol comprising the first symbol vector for a first transmit antenna;
means for generating a second SC-FDMA symbol comprising the second symbol vector for a second transmit antenna; and
means for transmitting the first SC-FDMA symbol from the first transmit antenna and the second SC-FDMA symbol from the second transmit antenna within a same SC-FDMA symbol period to achieve transmit diversity.

12. The apparatus of claim 11, further comprising:
means for generating the third modulation symbol sequence based on a version of the second modulation symbol sequence; and
means for generating the fourth modulation symbol sequence based on a version of the first modulation symbol sequence.

13. The apparatus of claim 11, wherein the first set of cyclic prefixes comprises a first cyclic prefix for the first modulation symbol sequence and a second cyclic prefix for the second modulation symbol sequence, and wherein the second set of cyclic prefixes comprises a third cyclic prefix for the third modulation symbol sequence and a fourth cyclic prefix for the fourth modulation symbol sequence.

14. The apparatus of claim 13, wherein the first set of cyclic postfixes comprises a first cyclic postfix for the first modulation symbol sequence and a second cyclic postfix for the second modulation symbol sequence, and wherein the second set of cyclic postfixes comprises a third cyclic postfix for the third modulation symbol sequence and a fourth cyclic postfix for the fourth modulation symbol sequence.

15. An apparatus for wireless communication, comprising:
at least one processor; and
a memory in electronic communication with the at least one processor, the memory storing instructions that cause, when executed by the least one processor, the apparatus to:
form a first symbol vector comprising a first modulation symbol sequence, a second modulation symbol sequence, a first set of cyclic prefixes having a first length, and a first set of cyclic postfixes having a second length, form a second symbol vector comprising a third modulation symbol sequence, a fourth modulation symbol sequence, a second set of cyclic prefixes having the first length, and a second set of cyclic postfixes having the second length, the third modulation symbol sequence being generated based on the second modulation symbol sequence, and the fourth modulation symbol sequence being generated based on the first modulation symbol sequence, generate a first single-carrier frequency division multiple access (SC-FDMA) symbol comprising the first symbol vector for a first transmit antenna, generate a second SC-FDMA comprising the second symbol vector for a second transmit antenna, and transmit the first SC-FDMA symbol from the first transmit antenna and the second SC-FDMA symbol from the second transmit antenna within a same SC-FDMA symbol period to achieve transmit diversity.

16. The apparatus of claim 15, wherein the at least one processor is configured to generate the third modulation symbol sequence based on a version of the second modulation symbol sequence, and to generate the fourth modulation symbol sequence based on a version of the first modulation symbol sequence.

17. The apparatus of claim 15, wherein the first set of cyclic prefixes comprises a first cyclic prefix for the first modulation symbol sequence and a second cyclic prefix for the second modulation symbol sequence, and wherein the second set of cyclic prefixes comprises a third cyclic prefix for the third modulation symbol sequence and a fourth cyclic prefix for the fourth modulation symbol sequence.

18. The apparatus of claim 17, wherein the first set of cyclic postfixes comprises a first cyclic postfix for the first modulation symbol sequence and a second cyclic postfix for the second modulation symbol sequence, and wherein the second set of cyclic postfixes comprises a third cyclic postfix for the third modulation symbol sequence and a fourth cyclic postfix for the fourth modulation symbol sequence.

19. A non-transitory computer-readable medium comprising:

code for causing at least one computer to form a first symbol vector comprising a first modulation symbol sequence a second modulation symbol sequence, a first set of cyclic prefixes having a first length, and a first set of cyclic postfixes having a second length, code for causing the at least one computer to form a second symbol vector comprising a third modulation symbol sequence a fourth modulation symbol sequence, a second set of cyclic prefixes having the first length, and a second set of cyclic postfixes having the second length, the third modulation symbol sequence being generated based on the second modulation symbol sequence, and the fourth modulation symbol sequence being generated based on the first modulation symbol sequence, code for causing the at least one computer to generate a first single-carrier frequency division multiple access (SC-FDMA) symbol comprising the first symbol vector for a first transmit antenna, and code for causing the at least one computer to generate a second SC-FDMA symbol comprising the second symbol vector for a second transmit antenna, and code for transmitting the first SC-FDMA symbol from the first transmit antenna and the second SC-FDMA symbol from the second transmit antenna within a same SC-FDMA symbol period to achieve transmit diversity.

20. A method for wireless communication, comprising:

receiving at a receiver a single-carrier frequency division multiple access (SC-FDMA) symbol comprising a first SC-FDMA symbol sent from a first transmit antenna and a second SC-FDMA symbol sent from a second transmit antenna at a transmitter, the first SC-FDMA symbol being generated by the transmitter and comprising a first symbol vector comprising a first modulation symbol sequence a second modulation symbol sequence a first set of cyclic prefixes having a first length, and a first set of cyclic postfixes having a second length, the second SC-FDMA symbol being generated by the transmitter and comprising a second symbol vector comprising a third modulation symbol sequence a fourth modulation symbol sequence, a second set of cyclic prefixes having the first length, and a second set of cyclic postfixes having the second length, and the third and fourth modulation symbol sequences being generated based on the second and first modulation symbol sequences, respectively, wherein the first SC-FDMA symbol from the first transmit antenna and the second SC-FDMA symbol from the second transmit antenna are transmitted within a same SC-FDMA symbol period;

processing the received SC-FDMA symbol to obtain estimates of the first and second modulation symbol sequences; and obtaining estimates of the first and second modulation symbol sequences.

21. The method of claim 20, wherein the processing the received SC-FDMA symbol comprises performing SC-FDMA demodulation on the received SC-FDMA symbol to obtain received symbols for a set of subcarriers used for transmission and to obtain time-domain input samples based on the received symbols, and performing symbol detection based on the input samples, a first channel estimate for the first transmit antenna, and a second channel estimate for the second transmit antenna to obtain the estimates of the first and second modulation symbol sequences.

22. The method of claim 21, wherein the performing symbol detection comprises demultiplexing the input samples into first input samples and second input samples, transforming the first input samples to frequency domain to obtain first input symbols, transforming the second input samples to frequency domain to obtain second input symbols, combining the first and second input symbols based on the first and second channel estimates to obtain first and second detected symbols, transforming the first detected symbols to time domain to obtain an estimate of the first modulation symbol sequence, and transforming the second detected symbols to time domain to obtain an estimate of the second modulation symbol sequence.

23. The method of claim 22, wherein the combining the first and second input symbols comprises summing a first version of the first input symbols multiplied with a first version of the first channel estimate and a first version of the second input symbols multiplied with a first version of the second channel estimate to obtain the first detected symbols, and summing a second version of the first input symbols multiplied with a second version of the second channel estimate and a second version of the second input symbols multiplied with a second version of the first channel estimate to obtain the second detected symbols.

24. The method of claim 20, further comprising:

obtaining at least one additional received SC-FDMA symbol at the receiver, each first and second channel estimates additional received SC-FDMA symbol comprising the first and second SC-FDMA symbols sent by the transmitter, each received SC-FDMA symbol being obtained from a different antenna at the receiver; and processing all received SC-FDMA symbols to obtain the estimates of the first and second modulation symbol sequences.

25. The method of claim 24, wherein the processing all SC-FDMA symbols comprises performing SC-FDMA demodulation on each received SC-FDMA symbol to obtain received symbols for the set of subcarriers used for transmission and to obtain time-domain input samples based on the received symbols, and performing symbol detection based on the input samples from all received SC-FDMA symbols and channel estimates for the first and second transmit antennas to obtain the estimates of the first and second modulation symbol sequences.

26. An apparatus for wireless communication, comprising:

means for receiving at a receiver a received single-carrier frequency division multiple access (SC-FDMA) symbol comprising a first SC-FDMA symbol sent from a first transmit antenna and a second SC-FDMA symbol sent from a second transmit antenna at a transmitter, the first SC-FDMA symbol being generated by the transmitter and comprising a first symbol vector comprising a first modulation symbol sequence, a second modulation symbol sequence, a first set of cyclic prefixes having a first length, and a first set of cyclic postfixes having a second length, the second SC-FDMA symbol being generated by the transmitter and comprising a second symbol vector comprising a third modulation symbol sequence, a fourth modulation symbol sequence, a second set of cyclic prefixes having the first length, and a second set of cyclic postfixes having the second length, and the third and fourth modulation symbol sequences being generated based on the second and first modulation symbol sequences, respectively, wherein the first SC-FDMA symbol from the first transmit antenna and the second SC-FDMA symbol from the second transmit antenna are transmitted within a same SC-FDMA symbol period;

means for processing the received SC-FDMA symbol to obtain estimates of the first and second modulation symbol sequences; and means for obtaining estimates of the first and second modulation symbol sequences.

27. The apparatus of claim 26, wherein the means for processing the received SC-FDMA symbol comprises means for performing SC-FDMA demodulation on the received SC-FDMA symbol to obtain received symbols for a set of subcarriers used for transmission and to obtain time-domain input samples based on the received symbols, and means for performing symbol detection based on the input samples, a first channel estimate for the first transmit antenna, and a second channel estimate for the second transmit antenna to obtain the estimates of the first and second modulation symbol sequences.

28. The apparatus of claim 27, wherein the means for performing symbol detection comprises means for demultiplexing the input samples into first input samples and second input samples, means for transforming the first input samples to frequency domain to obtain first input symbols, means for transforming the second input samples to frequency domain to obtain second input symbols, means for combining the first and second input symbols based on the first and second channel estimates to obtain first and second detected symbols, means for transforming the first detected symbols to time domain to obtain an estimate of the first modulation symbol sequence, and means for transforming the second detected symbols to time domain to obtain an estimate of the second modulation symbol sequence.

29. The apparatus of claim 28, wherein the means for combining the first and second input symbols comprises means for summing a first version of the first input symbols multiplied with a first version of the first channel estimate and a first version of the second input symbols multiplied with a first version of the second channel to obtain the first detected symbols, and means for summing a second version of the first input symbols multiplied with a second version of the second channel estimate and a second version of the second input symbols multiplied with a second version of the first channel to obtain the second detected symbols.

30. The apparatus of claim 26, further comprising:

means for obtaining at least one additional received SC-FDMA symbol at the receiver, each additional received SC-FDMA symbol comprising the first and second SC-FDMA symbols sent by the transmitter, each received SC-FDMA symbol being obtained from a different antenna at the receiver; and means for processing all received SC-FDMA symbols to obtain the estimates of the first and second modulation symbol sequences.

* * * * *